United States Patent [19]
Godkin

[11] Patent Number: 5,317,220
[45] Date of Patent: May 31, 1994

[54] LINEAR DC MOTOR

[76] Inventor: Mikhail Godkin, 4414 Exbury Ct., San Diego, Calif. 92130

[21] Appl. No.: 903,493

[22] Filed: Jun. 24, 1992

[51] Int. Cl.⁵ ............................................ H02K 41/00
[52] U.S. Cl. ...................................... 310/12; 318/135
[58] Field of Search ............................. 310/12, 13, 14; 318/135

[56] References Cited

U.S. PATENT DOCUMENTS

| | | | |
|---|---|---|---|
| 4,369,383 | 9/1979 | Langley | 310/12 |
| 4,644,199 | 2/1987 | Langley | 310/12 |
| 4,906,878 | 3/1990 | Twaalfhoven | 310/12 |
| 4,908,533 | 3/1990 | Karita et al. | 310/12 |
| 5,128,569 | 7/1992 | Gladish | 310/12 |

Primary Examiner—Steven L. Stephan
Assistant Examiner—Matthew Nguyen
Attorney, Agent, or Firm—Thomas J. Tighe

[57] ABSTRACT

An embodiment has an armature member having a linear core with transverse open slots distributed over its length. Two sets of coils are disposed in the slots and distributed over the length of the core preferably in an overlapping interlaced pattern such that when the sets of coils, or corresponding sub-sets of the coils, are simultaneously energized the magnetic forces produced by one augments the forces produced by the other to produce a greater total force. The armature member also has disposed on opposite sides of the core and parallel to the core a pair of linear commutators. A field member has a carriage which travels rectilinearly along the core between the commutators. Dual sets of brushes are linearly mounted on the carriage at opposite sides to communicate with the commutators. The dual sets of coils can be energized in parallel or in series via the brush/commutator contacts or each set of coils can be energized separately by independently powering the set's corresponding set of brushes. An impedance matching device allows armatures to be joined colinearly to increase the effective stroke of the field member without an impedance anomaly at the juncture.

16 Claims, 4 Drawing Sheets

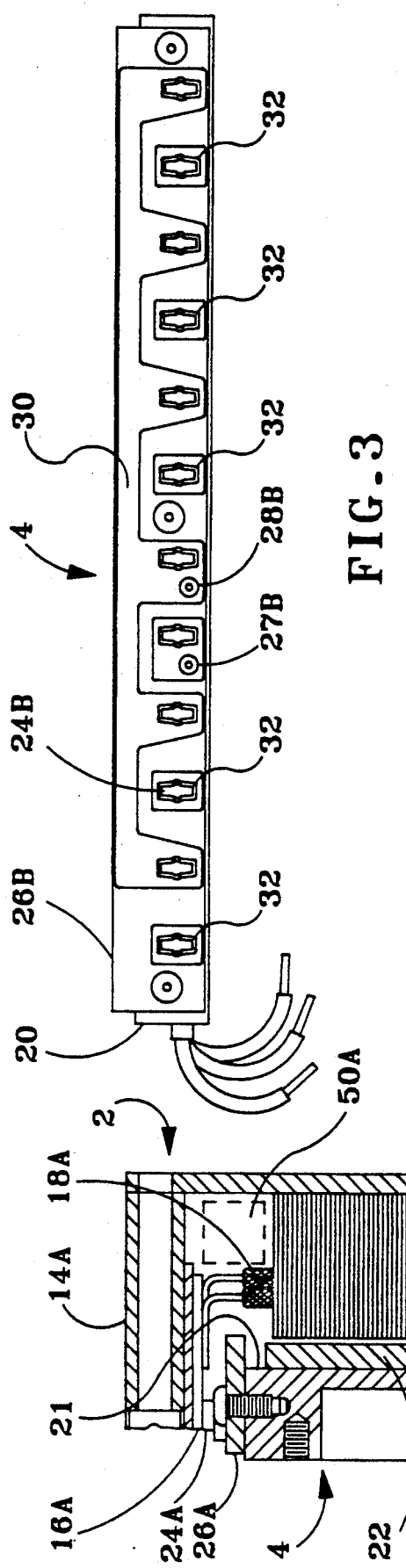
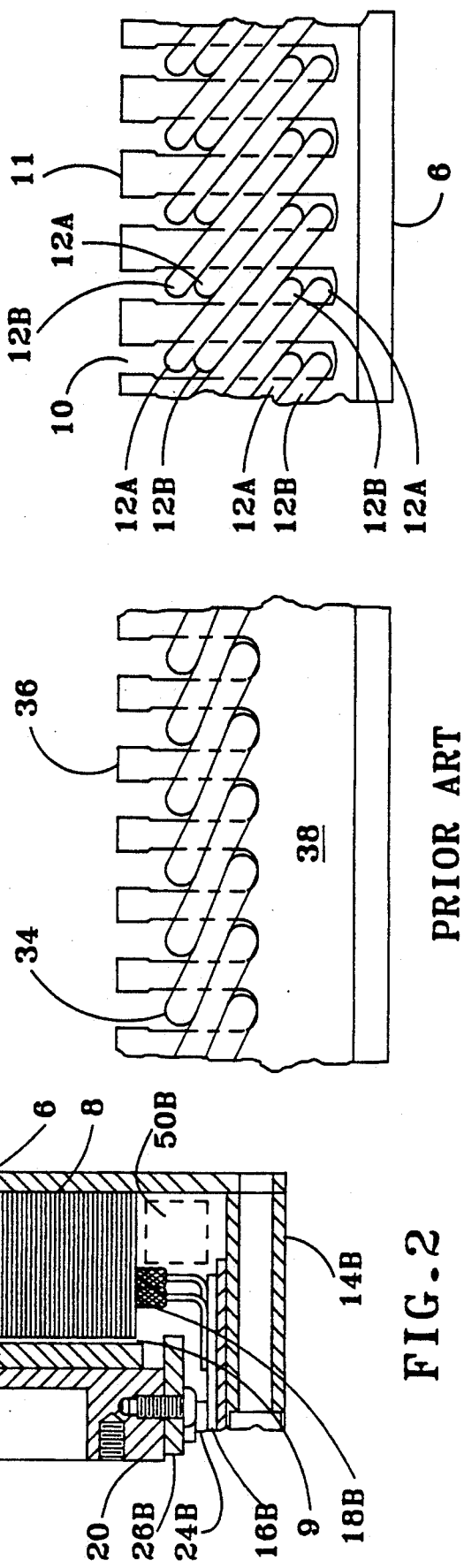
FIG._3
FIG._5
PRIOR ART
FIG._4
FIG._2

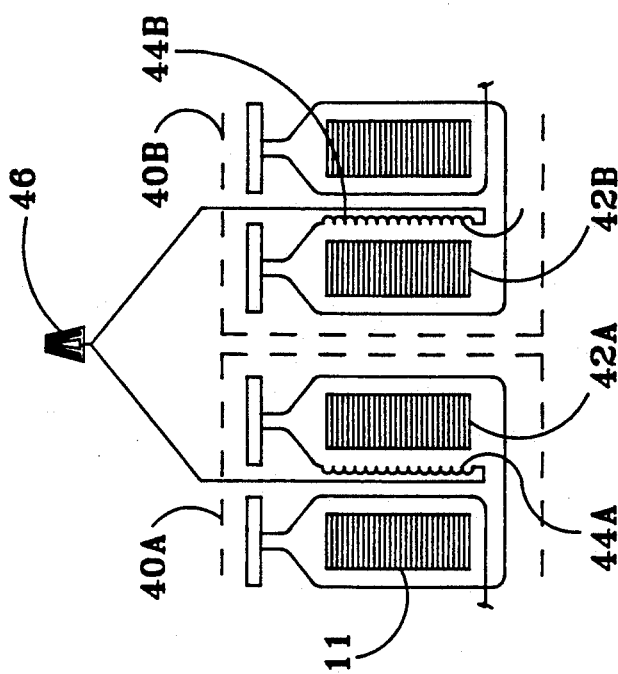
FIG. 8
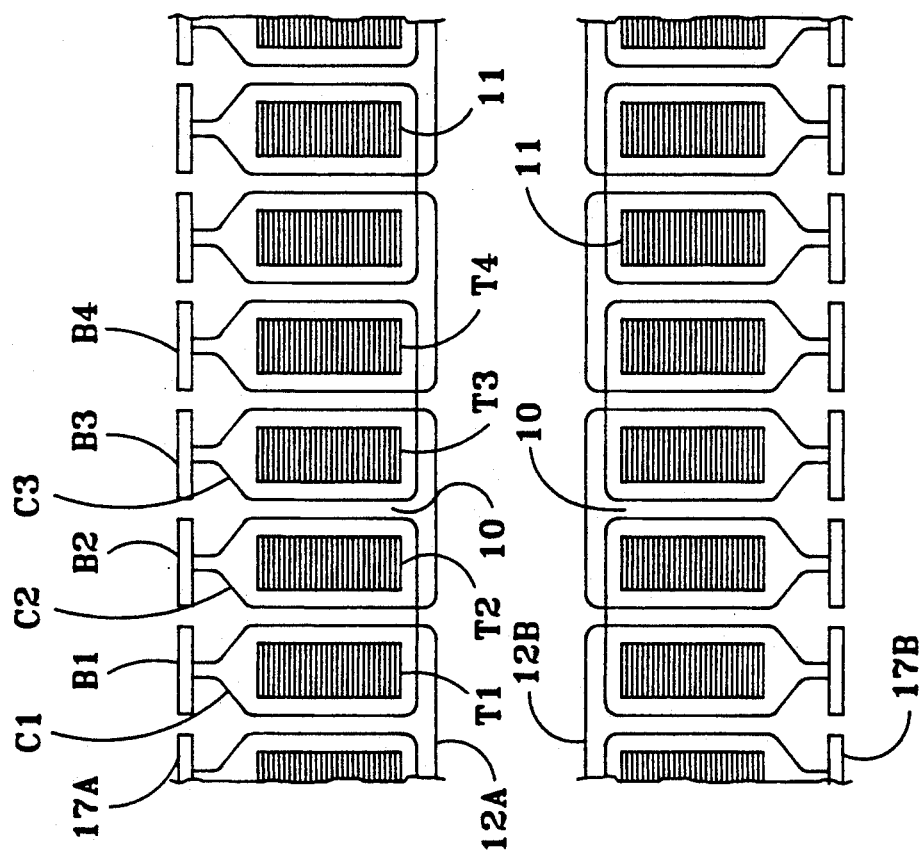
FIG. 7
FIG. 6

LINEAR DC MOTOR

BACKGROUND OF THE INVENTION

This invention relates to linear direct-current (DC) permanent magnet motors.

Heretofore, linear motors have been presented having a permanent magnet field member that moves rectilinearly over a linear bed of overlapping, stationary (relative to the field member) armature coils wound about teeth of an elongated slotted core, each coil being energized in sequence via commutator/brush contacts as the field member passes overhead. Movement of the field member relative to the armature is caused by interaction of the energized coils with the magnetic field of the permanent magnet member. An example of such a motor is disclosed in U.S. Pat. No. 4,369,383 by Langley.

Such motors have traditionally had overheating problems and commutator/brush contact burn problems, and so various ways have been devised to reduce the heat generation and/or dissipate the heat generated, particularly heat in the commutators.

For example, U.S. Pat. No. 4,906,878 by Twealfhoven et al. presents a linear DC motor as described above having a network of fluid coolant manifolds strategically placed to remove heat.

This invention was conceived and designed to, among other things, distribute current in a more even and balanced fashion which results in less concentrated heat generation, particularly in the commutators, giving motors built according to this invention improved heat damage resistance. As will be explained, this invention also provides basically two motors in one because of separately controllable armature coils.

Other attributes and advantages of this invention will become apparent upon a reading of the text hereinafter.

SUMMARY OF THE INVENTION

It is an object of this invention to present a linear DC motor using dual commutator boards and corresponding dual sets of brush contactors to reduce the current through the brush/commutator contacts by approximately a factor of two for a given applied power.

It is a further object of the invention to present a linear DC motor having dual sets of armature coils in corresponding electrical communication with dual commutator boards which contact dual sets of brush contactors in order to make the motor more resistant to heat damage by more balance distribution of driving current.

It is a further object of this invention to present a linear DC motor in which the heat dissipated in the brush/commutator contacts is reduced by approximately a factor of four.

It is a further object of this invention to present a linear DC motor with improved heat damage resistance to overheating in general.

It is a further object of this invention to present a linear DC motor that is more resistant to heat damage in applications where the moving member of the motor must oscillate between certain positions.

It is a further object of this invention to present a linear DC motor with improved resistance to commutator strip burn-out.

It is a further object of this invention to present a linear motor with dual sets of magnetically cumulative armature coils in which the sets can be progressively energized in parallel or in series, or in which the sets can be energized independently.

It is a further object of this invention to present a linear motor with dual sets of magnetically cumulative armature coils in which the sets can be each selectively progressively energized to more efficiently match load conditions.

These and other objects which can be discerned from a reading of the text herein are accomplished by a linear DC motor comprising a linear core defining a plurality of slots distributed over its length, dual sets of coils disposed in said slots, corresponding dual commutation means each for progressively energizing its corresponding set of coils, respective magnetic forces produced by energization of corresponding members of the sets of coils being mutually augmentative, and field means relatively moveable rectilinearly along and parallel to the core proximate thereto for presenting a magnetic field to the sets of coils, the interaction of the magnetic field from the field means and magnetic forces produced by progressive energization of at least one of the sets of coils causing movement of the field means relative to the core. An embodiment of the motor has an armature member and a field member rectilinearly moveable relative to the armature member. The armature member comprises a linear core that defines a plurality of open transverse slots distributed over its length, a first set of coils disposed in said slots, a second set of coils disposed in said slots in a way that when both sets are simultaneously energized the magnetic forces produced by them are mutually augmentative, a first linear commutator in electrical communication with each coil in the first set of coils, and a second linear commutator in electrical communication with each coil in the second set of coils. The field member comprises a carriage having a side facing the core slots, the carriage being moveable relative to the armature member rectilinearly along and parallel to the core, means mounted on the side of the carriage facing the core slots and proximate thereto for presenting a magnetic field to the sets of coils, a first linear brush means mounted on the carriage and communicating with the first linear commutator for progressively energizing the first set of coils, and a second linear brush means mounted on the carriage and communicating with the second linear commutator for progressively energizing the second set of coils. The interaction of the magnetic field from the field member and the magnetic field produced by progressive energization of one or both of the sets of coils causing movement of the field member relative to the armature member. Preferably the first and second sets of coils are interlaced in the core slots to balance the impedances and heat dissipation of both sets of coils. The field member can further comprise means for distributing power to both linear brush means for simultaneous parallel or serial progressive energization of both sets of coils, or means for distributing power to both linear brush means for selective progressive energization of each of the sets of coils.

BRIEF DESCRIPTION OF THE DRAWINGS

FIG. 2 is a cross-sectional view of the linear DC motor of FIG. 1 taken along line 2—2.

FIG. 3 is a side elevational view of a rectilinearly movable field member according to this invention.

FIG. 4 is a diagrammatic partial side view of the coils and core of a stationary (relative to a field member) armature member of a prior art linear DC motor.

FIG. 5 is a diagrammatic partial side view of the coils and core of an armature member of a linear DC motor according to this invention.

FIG. 6 is a schematic representation of a first set of armature coils and its associated commutator board according to this invention.

FIG. 7 is a schematic representation of a second set of armature coils and its associated commutator board according to this invention.

FIG. 8 is a diagram of an electrical interface between two armature modules joined end-to-end to extend the effective armature length.

DESCRIPTION OF THE PREFERRED EMBODIMENT

Figure 1:
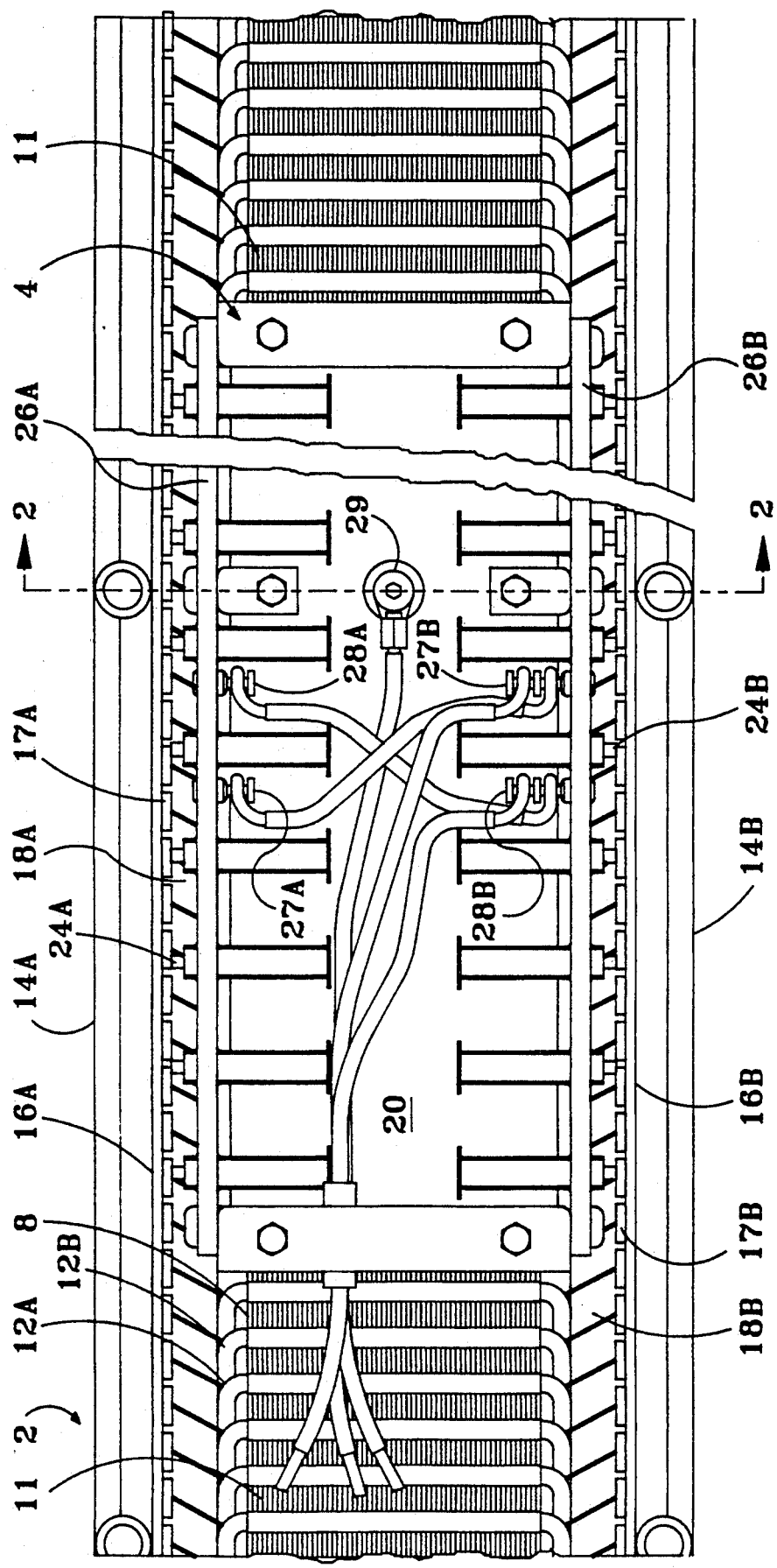
FIG. 1 is a partial plan view of a linear DC motor according to this invention.

Referring to FIGS. 1-3 and 5, a motor according to this invention comprises in general an elongated armature member, generally designated 2, and a field member, generally designated 4, which moves relative the armature member rectilinearly along a length of the armature member. Movement of the field member relative to the armature member is caused by magnetic field interaction between the two. The armature member has a base 6 upon which is affixed a linear core illustrated as an elongated laminated core 8, the laminations being normal to the base. The core defines a plurality of parallel, uniformly spaced, open transverse slots 10, the slots preferably being normal to a longitudinal axis of the core. The solid intervals of core 11 between the slots are commonly called "teeth" of the core. Disposed in the slots are two sets of electromagnetic armature coils, 12A and 12B. Projecting from and along the long margins of the base 6 are opposite walls, 14A and 14B. Mounted separately on the inside faces of the walls are two linear commutators illustrated as two elongated commutator boards, 16A and 16B, each having a plurality of inwardly facing commutator bars, 17A and 17B respectively, uniformly spaced along lines parallel to the line of carriage movement. A first set of armature coils 12A electrically communicates with the commutator bars of a first commutator board 16A by means of connections 18A, and the second set of armature coils 12B electrically communicates with the commutator bars of the second commutator board 16B by means of connections 18B.

Referring to FIG. 7, illustrated are representative electrical connections between the first set of armature coils 12A and the commutator bars 17A of the first commutator board 16A, and representative windings of the coils about the core teeth 11. For a given set of consecutive commutator bars, B1-B4, and adjacent consecutive core teeth, T1-T4, a coil C1 is wound around teeth T1 and T2 with one end electrically connected to commutator bar B1 and the other end electrically connected to commutator bar B2. A second coil C2 is wound about teeth T2 and T3, overlapping the first coil C1, with one end electrically connected to bar B2 and the other end electrically connected to bar B3. A third coil C3 is wound about teeth T3 and T4, overlapping the second coil C2, with one end electrically connected to bar B3 and the other end electrically connected to bar B4. In essence, each coil is wound about two consecutive core teeth and the coil's two ends are separately connected to two consecutive commutator bars adjacent to said core teeth. This pattern of overlapping coils is used throughout the armature. Although the coils in this illustration (and FIG. 6 as discussed below) are each represented by a single line, it should be understood that a coil wound about a pair of core teeth, as described herein, comprises a plurality of wire wraps encircling the teeth and not just a single wrap.

Referring to FIG. 6, illustrated are representative electrical connections between the second set of armature coils 12B and the commutator bars 17B of the second commutator board 16B, and representative windings of the coils about the core teeth 11. The electrical relationship between the second set of coils and the commutator bars of the second commutator board is a mirror image of the relationship described above concerning the first set of armature coils and the commutator bars of the first commutator board, the description referencing FIG. 6. The description of how the first set of armature coils is wound about the core teeth is equally applicable to how the second set is wound about the teeth. The same pattern of overlapping coils is used throughout the armature.

It should be noted that although the patterns of coil windings as discussed above with reference to FIGS. 6 and 7 are preferred, other winding patterns can be used without departing from the purposes and scope of the subject invention and the claims which follow. Regardless of the pattern used, the first an second sets of coils are disposed in the core slots in a way that when corresponding members of each set are simultaneously energized, the magnetic forces produced by them are mutually augmentative in that the magnetic forces are vectorialy combined to exert mechanical force on the field member.

Referring again to FIGS. 1-3, the field member 4 has an elongated carriage 20 with a side 21 that faces the armature member, which side shall herein be arbitrarily referred to as a "bottom" of the carriage for reference purposes only. (Likewise all corresponding references to a "top" or "side" or "sides" of the carriage are merely arbitrarily chosen references, it being understood that no limitations to the physical orientation of the invention described herein should be construed from such arbitrary references.) Coplanarly mounted on the bottom of the carriage and oriented transverse to the line of carriage movement are a plurality of uniformly spaced permanent bar magnets 22 commonly called "poles". Linearly mounted on top of the carriage and uniformly spaced along opposite long sides of the carriage are two sets of brush contactors, 24A and 24B. The brush contactors are spring biased to jut outwardly from their respective sides to make electrical contact with the commutator bars on corresponding sides of the armature member.

In operation, the brush contactors, i.e. brushes, progressively energize the armature coils in that corresponding subsets of each set of coils are energized when the field member passes by them as it progresses along the armature member. At any given time the corresponding subsets that are being energized are only those coils immediately adjacent the poles of the field member.

Referring again to FIGS. 1-3, these dual linear sets of brush contactors are in electrical communication with corresponding dual power distribution boards, 26A and 26B respectively, each of which distributes two voltages of opposite polarity to its corresponding set of brushes such that all pairs of adjacent brushes in the set receive voltages of opposite polarity. In other words, the polarity of the brushes in each set alternates from brush to brush. Each power distribution board is mounted on the same carriage side as is mounted the set of brush contactors to which the board distributes power. The distribution boards, 26A and 26B, each receive voltage of a first polarity (with respect to a ground reference) via terminal posts, 27A and 27B respectively. The boards receive a second voltage of equal magnitude but opposite polarity via terminal posts, 28A and 28B respectively. FIGS. 1 and 3 illustrate that these voltages are delivered via wires (not individually designated) in electrical communication with voltage sources (not shown). A third wire provides a ground or reference potential to the carriage via connecting wire post 29.

Figure 9:
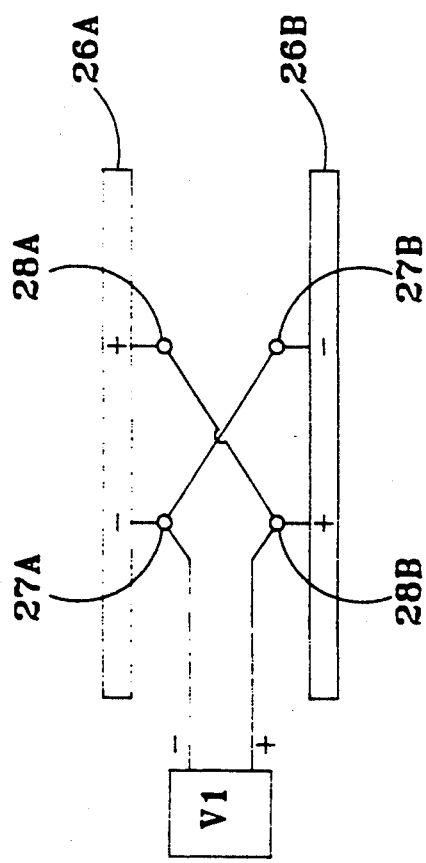
FIGS. 9-11 are schematics of three alternate power source connections for this invention.
Figure 10:
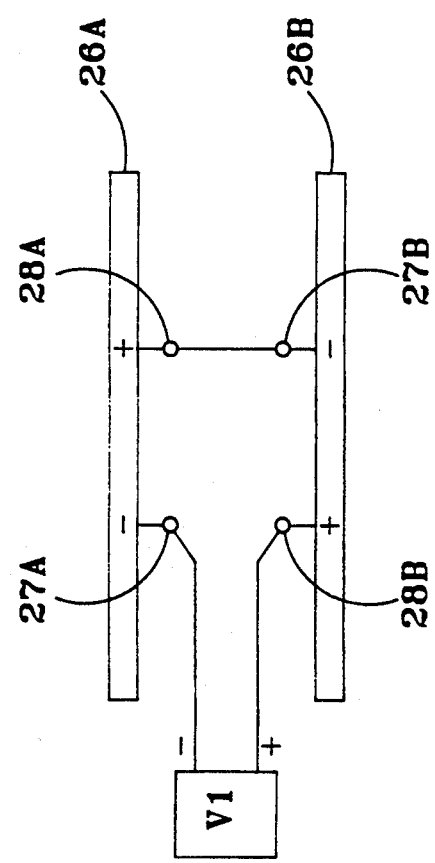
Figure 11:
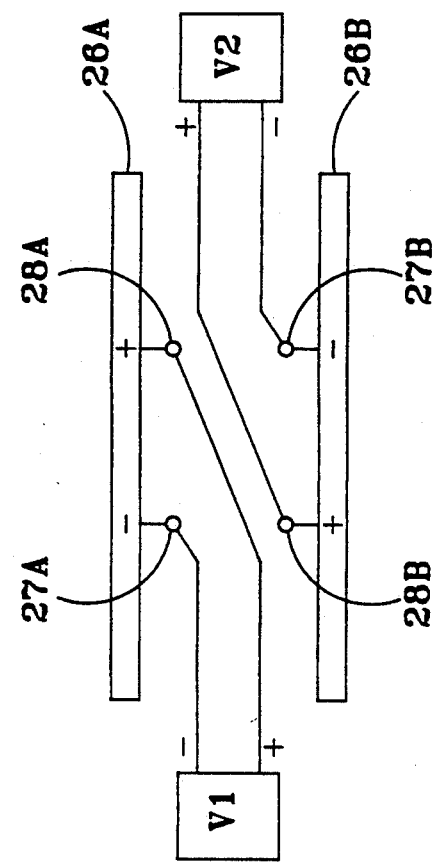

As illustrated in FIG. 1, the two sets of brushes are connected to the power source in parallel, but as illustrated in FIGS. 9-11, the set of brushes can be powered in alternative configurations. FIG. 9 illustrates the power distribution boards, 26A and 26B, connected in parallel to a common power source VI. The positive terminals, 28A and 28B respectively, of the boards are connected in parallel to a positive terminal of the power source, and the negative terminals, 27A and 27B respectively, are connected in parallel to a negative terminal of the power source. In FIG. 10, the boards are connected in series to a common power source VI. Only the positive terminal of the second board 26B is connected to the positive terminal of the power source, and only the negative terminal 27A of the first board 26A is connected to the negative terminal of the power source. The boards are linked serially by the connection between the negative terminal 27B of the second board and the positive terminal 28A of the first board. FIG. 11 illustrates the power distribution boards being independently powered from the separate power sources, V1 and V2. The positive and negative terminals of the first board 26A are connected to the corresponding terminals of a first voltage source V1, and the positive and negative terminals of the second board 26B are connected to the corresponding terminals of a second voltage source V2. In general less voltage but more current is required for a parallel connection than for a series connection. Having the brush sets powered separately has some advantages. For example, if the power to the brush sets are separately controlled, one set of armature coils could be energized under normal load conditions and the other set of coils additionally energized under heavier load conditions. This increases the overall efficiency of the motor.

FIG. 3 illustrates the commutator, or outboard, face of one of the power distribution boards 26B. The board's second terminal post 28B communicates with the even numbered brush contactors (arbitrarily counting from the left) via a conductive clad network illustrated as a clad strip 30 having fingers surrounding the even numbered brushes. The board's first terminal post 27B communicates with every odd numbered brush contactor 24B (again counting from the left) via a conductive clad network parts of which are illustrated as a plurality of pads 32 that communicate by feedthroughs (not shown) with a clad strip, much the same as clad strip 30, on the reverse face of the board (not illustrated). The other power distribution board 27A distributes voltages to the other set of brushes in similar fashion such that corresponding brushes on opposite sides of the carriage are of opposite polarity. By this arrangement, the magnetic fields produced by any subset of one set of coils augments the magnetic fields produce by a corresponding subset of the other set of coils when both subsets are simultaneously energized.

Referring again to FIG. 2, in operation the carriage rides slightly above the core 8 with an air gap 9 between, the gap being controlled by mechanical supports not a part of this invention. These supports are typically members of mechanisms in which the motor is incorporated, or linear bearings attached to the motor.

Referring to FIGS. 4 and 5, a difference between prior art linear DC motors and the present invention can be seen. FIG. 4 illustrates a typical prior art linear DC motor wherein only a single set of armature coils 34 are overlappingly wound about teeth 36 of an armature core 38. In contrast, FIG. 5 illustrates preferred dispositions of the dual sets of armature coils, 12A and 12B, according to this invention. To balance the impedances and heat dissipation of both sets of coils, it is preferred that the sets be physically interlaced on the core. This is done by alternating the vertical positions of corresponding coils from each set as they are wound about the core teeth 11. For example, the leftmost core slot illustrated in FIG. 6 contains segments of coils from both sets, 12A and 12B, stacked such that segments from the first set 12A are first and third in the stack (counting from the top of the stack) and segments from the second set of coils 12B are second and fourth in the stack. Alternately, the next core slot to the right contains segments stacked such that segments from the second set of coils 12B are first and third in the stack (again counting from the top of the stack) and segments from the first set of coils 12A are second and fourth in the stack. This alternating stacking arrangement for interlacing the coil sets exists throughout the armature.

Although the cores and their respective slots are not identically illustrated in FIGS. 4 and 5, it should be noted that the core and slots of this invention need not differ at all from prior art cores and slots. The differences as illustrated are for clarity of understanding only. The core, slots and teeth of a linear motor according to this invention (FIG. 5) can be identical to the core, slots and teeth of a conventional linear motor (FIG. 4). Moreover the total volume of coil material, e.g. copper, in a given slot of this invention (FIG. 5) can be identical to the volume in a given slot of a conventional motor (FIG. 4) simply by using suitably higher gauge wire for the coils, 12A and 12B, of this invention. While the coils in FIG. 5 are illustrated to be neatly stacked, in practice they can be crammed in order into a conventional sized slot and still function as described herein.

Since heat is generated in the armature coils, having two physically distinct windings connected to two physically separated commutator boards basically divides the heat transferred from the windings to the commutators. Also the armature current is divided between two commutator boards. These features improve the motor's resistance to heat damage.

It should be noted that the above-described armature member can be the complete armature for a motor as well as an armature module which can be physically and electrically joined linearly to another such module to increase the effective armature length. FIG. 8 illustrates such a joining as it pertains to one set of armature coils only, but it should be noted that the discussion hereinafter also pertains to armature modules having dual sets of coils according to this invention. Two armature modules, 40A and 40B, (represented in phantom) are abutted end-to-end such that end teeth, 42A and 42B, of the respective modules are adjacent to each other. In this arrangement a single field member 4 (FIG. 1) can traverse both armature modules as described above for a single armature member. If the modules are wound as illustrated in FIG. 6, the adjacent end commutator bars will not be joined by a coil wound about the two end teeth and there will be a discontinuity in the overlapping coil pattern as described above, and therefore there will be a discontinuity in armature impedance in the zone where the modules are joined. To compensate for this discontinuity in impedance, the missing coil is replaced by an inductance illustrated here as two inductive coils, 44A and 44B, of suitable characteristics each wound around small magnetic steel rods and separately inserted into the end core slots of the armature modules. Each inductor has one lead wire connected to an end commutator bar in the module in which it has been inserted, and the inductors are connected together externally by their other lead wires. The characteristics of the inductors are suitable if they combine to substantially match the impedance of, the missing coil which they are replacing measured from the commutator bars. In the case where the joined armature modules have dual sets of armature coils and dual commutators there would be two pairs of inductors, each pair inserted and connected as described above.

Although the gap between the end teeth, 42A and 42B, of the two joined armature modules of FIG. 8, and the gap between end commutator bars, are illustrated to be larger than the core slots and commutator bar gaps as illustrated in FIGS. 6 and 7, preferably this is not the case. The larger gaps are for clarity of understanding only. Preferably modules can be joined end-to-end such that the gaps between end teeth and end commutator bars are no larger than the slots and commutator bar gaps internal to the modules.

Referring again to FIG. 2, illustrated by phantom squares 50A and 50B are optional fluid coolant manifolds for removing heat from the core and coils. These manifolds can be part of a network such as disclosed in U.S. Pat. No. 4,906,878 by Twealfhoven et al.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims. For example, solid state commutating means can be used to progressively energize a dual set of armature coils in place of the brushes and commutator bars described above.

I claim:

1. A linear DC motor comprising:
   a linear core defining a plurality of slots distributed over its length,
   dual sets of coils disposed in said slots and interlaced in the core slots to balance impedances and heat dissipation thereof,
   corresponding dual commutation means each for progressively energizing its corresponding set of coils, respective magnetic forces produced by energization of corresponding members of the sets of coils being mutually augmentative, and field means relatively moveable rectilinearly along and parallel to the core proximate thereto for presenting a magnetic field to the sets of coils,
   the interaction of the magnetic field from the field means and magnetic forces produced by progressive energization of at least one of the sets of coils causing movement of the field means relative to the core.

2. The motor according to claim 1 wherein the dual commutation means energize the dual sets of coils in parallel.

3. The motor according to claim 1 wherein the dual sets of coils are connected in series.

4. The motor according to claim 1 wherein the dual commutation means energize the dual sets of coils separately.

5. A linear DC motor comprising:
   an armature member comprising:
      a linear core defining a plurality of open transverse slots distributed over its length,
      dual sets of coils disposed in said slots, respective magnetic forces produced by energization of corresponding members of the sets of coils being mutually augmentative,
      corresponding dual linear commutator means each for providing energization access to each coil in its corresponding set of coils,
   a field member comprising:
      a carriage having a side facing the core slots, the carriage being moveable relative to the armature member rectilinearly along and parallel to the core,
      means mounted on the side of the carriage facing the core slots and proximate thereto for presenting a magnetic field to the sets of coils, and
      dual linear brush means corresponding to the dual linear commutator means and mounted on the carriage, each linear brush means communicating with its corresponding linear commutator means for progressively energizing a corresponding set of coils,
   the interaction of the magnetic field from the field member and magnetic forces produced by progressive energization of at least one of the sets of coils causing movement of the field member relative to the armature member.

6. The motor according to claim 5 wherein the dual linear commutator means are disposed on opposite sides of the core and parallel to the core, and wherein the carriage travels between the dual linear commutator means, and wherein the dual linear brush means are mounted on opposite sides of the carriage with each linear brush means squarely facing its corresponding linear commutator means.

7. The motor according to claim 5 wherein the dual sets of coils are interlaced in the core slots to balance impedances and heat dissipation of both sets of coils.

8. The motor according to claim 6 wherein the dual sets of coils are interlaced in the core slots to balance the impedances and heat dissipation of both sets of coils.

9. The motor according to claim 5 wherein the dual linear brush means energize the dual sets of coils in parallel.

10. The motor according to claim 6 wherein the dual linear brush means energize the dual sets of coils in parallel.

11. The motor according to claim 5 wherein the dual linear brush means energize the dual sets of coils in series.

12. The motor according to claim 6 wherein the dual linear brush means energize the dual sets of coils in series.

13. The motor according to claim 5 wherein the dual linear brush means energize the dual sets of coils separately.

14. The motor according to claim 6 wherein the dual linear brush means energize the dual sets of coils separately.

15. For two linear armature modules with respective commutators joined colinearly to increase effective armature length of a motor, each commutator having an end commutator bar at the juncture, a device for compensating for a discontinuity in impedance at the juncture, the device comprising two inductors electrically connected in series between the end commutator bars, each disposed in an end core slot adjacent the commutator bar to which it is connected, the impedance of the device under operating conditions of the motor substantially matching the impedance of an armature module coil which would otherwise be connected between the commutator bars if they were not end commutator bars.

16. The device according to claim 15 wherein the two individual inductive coils each comprise a coil wound around small magnetic steel rods.

* * * * *

UNITED STATES PATENT AND TRADEMARK OFFICE
CERTIFICATE OF CORRECTION

PATENT NO. : 5,317,220
DATED : May 31, 1994
INVENTOR(S) : Mikhail Godkin

It is certified that error appears in the above-indentified patent and that said Letters Patent is hereby corrected as shown below:

In column 5, line 30, insert --28B-- following the word "terminal."

Signed and Sealed this

Thirtieth Day of August, 1994

Attest:

BRUCE LEHMAN

Attesting Officer

Commissioner of Patents and Trademarks